United States Patent
Wu et al.

(10) Patent No.: US 11,864,043 B2
(45) Date of Patent: Jan. 2, 2024

(54) METHOD AND APPARATUS FOR BACKHAUL LINK SWITCHING

(71) Applicant: LENOVO (BEIJING) LIMITED, Beijing (CN)

(72) Inventors: Lianhai Wu, Beijing (CN); Haiming Wang, Beijing (CN); Jing Han, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 244 days.

(21) Appl. No.: 17/256,703

(22) PCT Filed: Jul. 5, 2018

(86) PCT No.: PCT/CN2018/094671
§ 371 (c)(1),
(2) Date: Dec. 29, 2020

(87) PCT Pub. No.: WO2020/006734
PCT Pub. Date: Jan. 9, 2020

(65) Prior Publication Data
US 2021/0258847 A1    Aug. 19, 2021

(51) Int. Cl.
*H04W 36/12*  (2009.01)
*H04W 36/00*  (2009.01)
*H04W 36/30*  (2009.01)

(52) U.S. Cl.
CPC ....... *H04W 36/12* (2013.01); *H04W 36/0058* (2018.08); *H04W 36/0061* (2013.01); *H04W 36/00837* (2018.08); *H04W 36/30* (2013.01)

(58) Field of Classification Search
CPC ............. H04W 36/12; H04W 36/0058; H04W 36/0061; H04W 36/00837; H04W 36/30; H04W 84/047; H04W 24/02; H04W 24/10
See application file for complete search history.

(56) References Cited

U.S. PATENT DOCUMENTS

| | | | |
|---|---|---|---|
| 2008/0013520 A1 | 1/2008 | Liu et al. | |
| 2011/0149769 A1* | 6/2011 | Nagaraja | H04W 52/12 370/252 |
| 2011/0208842 A1* | 8/2011 | Mildh | H04B 7/15507 709/227 |

(Continued)

FOREIGN PATENT DOCUMENTS

| | | | |
|---|---|---|---|
| CN | 101827358 A | * | 9/2010 |
| CN | 102158980 A | | 8/2011 |

(Continued)

OTHER PUBLICATIONS

English translation for CN-101827358-A.*

(Continued)

*Primary Examiner* — Marisol Figueroa
(74) *Attorney, Agent, or Firm* — Kunzler Bean & Adamson

(57) ABSTRACT

The subject application relates to methods and apparatuses. According to some embodiments of the subject application, a method includes: transmitting an identifier of a first communication device; and transmitting an identifier of a parent communication device of the first communication device, wherein the first communication device, the parent communication device, and a first base unit constitute a first backhaul link.

18 Claims, 9 Drawing Sheets

(56) References Cited

U.S. PATENT DOCUMENTS

| | | | | |
|---|---|---|---|---|
| 2014/0287757 A1* | 9/2014 | Borg | ...................... | H04W 8/26 |
| | | | | 455/436 |
| 2020/0205132 A1* | 6/2020 | Liu | ...................... | H04L 5/0053 |
| 2021/0058985 A1* | 2/2021 | Fujishiro | ............... | H04W 48/08 |

FOREIGN PATENT DOCUMENTS

| | | | | |
|---|---|---|---|---|
| CN | 104969653 A | | 10/2015 | |
| WO | 2012019558 A1 | | 2/2012 | |
| WO | WO-2012174995 A1 | * | 12/2012 | ........ H04W 36/0083 |
| WO | WO-2019246446 A1 | * | 12/2019 | ........ H04W 36/0055 |

OTHER PUBLICATIONS

WO 2013174995 A1, Yang N, Gao Y, Switching Method, System and Device in mobile relay network—English Translation.*

PCT/CN2018/094671, "International Search Report and the Written Opinion of the International Search Authority" ISA/CN, National Intellectual Property Administration, Office of the PRC China, dated Mar. 1, 2019, pp. 1-6.

Lenovo, Motorola Mobility, "Backhaul link reselection", R2-1807902, 3GPP TSG-RAN WG2 Meeting #102, May 21-May 25, 2018, pp. 1-4, Busan, Korea.

Lenovo, Motorola Mobility, "Scenario for Backhaul link switch", R1-1807904, 3GPP TSG-RAN WG2 Meeting #102, May 21-May 25, 2018, pp. 1-4, Busan, Korea.

Potevio, "The mobility in IAB", R2-1809997, 3GPP TSG-RAN WG2 NR AH1807 Meeting, Jul. 2-6, 2018, pp. 1-4, Montreal, Canada.

ZTE, "Discussion on IAB topology adaption", R2-1810211, 3GPP TSG-RAN WG2 NR AdHoc 1807, Jul. 2-6, 2018, pp. 1-4, Montreal, Canada.

Lenovo, Motorola Mobility, "Consideration on multi-hop network", R2-1810246, 3GPP TSG-RAN WG2 NR AH1807 Meeting, Jul. 2-6, 2018, pp. 1-3, Montreal, Canada.

Huawei, "Topology type, discovery and update for IAB", R3-183189, 3GPP TSG-RAN WG3 Meeting #100, May 21-25, 2018, pp. 1-5, Busan, Korea.

* cited by examiner

METHOD AND APPARATUS FOR BACKHAUL LINK SWITCHING

TECHNICAL FIELD

The subject application generally relates to wireless communication technology, especially for backhaul link switching in a wireless communications system.

BACKGROUND

In the 3rd Generation Partnership Project (3GPP), deployment of Relay Nodes (hereinafter referred to as RNs) in a wireless communication system is promoted. In a wireless communication system which includes RNs, a Base Station (BS) that provides connection to at least one RN, may be referred to as a Donor node or a Donor BS.

One or more RNs may be connected to one Donor node. One RN may be connected to one or more Donor nodes. There may be a single hop or multiple hops between a RN and a Donor node. In response to supporting single-hop in the wireless communication system, a RN is directly connected to the Donor node. In response to supporting multiple-hop in the wireless communication system, a RN may hop through one or more neighboring (or parent) RNs before reaching or connecting to the Donor node.

A backhaul link in a wireless communication system may include a link from a RN to the Donor node, where a single-hop technique is supported. A backhaul link in a wireless communication system may include a link from a RN through one or more neighboring (or parent) RNs to the Donor node, where a multiple-hop technique is supported.

Signal transmission may degrade or fail due to, for example, but is not limited to, geographic obstacles, congestion, failure of device(s), etc. Therefore, there is a need for a backhaul link switching or backhaul link reselection between a RN and a Donor node.

BRIEF SUMMARY OF THE DISCLOSURE

One embodiment of the subject application provides a method, which includes: transmitting an identifier of a first communication device; and transmitting an identifier of a parent communication device of the first communication device, wherein the first communication device, the parent communication device, and a first base unit constitute a first backhaul link.

Another embodiment of the subject application provides a non-transitory computer-readable medium having stored thereon computer-executable instructions to cause a processor to implement the above method.

Yet another embodiment of the subject application provides an apparatus, which includes: a non-transitory computer-readable medium having stored thereon computer-executable instructions to cause a processor to implement the above method; a receiving circuitry; a transmitting circuitry; and a processor coupled to the non-transitory computer-readable medium, the receiving circuitry and the transmitting circuitry.

Yet another embodiment of the subject application provides a method, which includes: receiving an identifier of a first communication device; and receiving an identifier of a parent communication device of the first communication device, wherein the first communication device, the parent communication device, and a first base unit constitute a first backhaul link.

Yet another embodiment of the subject application provides a non-transitory computer-readable medium having stored thereon computer-executable instructions to cause a processor to implement the above method.

Yet another embodiment of the subject application provides an apparatus, which includes: a non-transitory computer-readable medium having stored thereon computer-executable instructions to cause a processor to implement the above method; a receiving circuitry; a transmitting circuitry; and a processor coupled to the non-transitory computer-readable medium, the receiving circuitry and the transmitting circuitry.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only example embodiments of the disclosure and are not therefore to be considered as limiting of its scope.

DETAILED DESCRIPTION

The detailed description of the appended drawings is intended as a description of preferred embodiments of the subject application, and is not intended to represent the only form in which the subject application may be practiced. It should be understood that the same or equivalent functions may be accomplished by different embodiments that are intended to be encompassed within the spirit and scope of the subject application.

3GPP is envisioning an Integrated Access and Backhaul (IAB) architecture for the 5G (NR) communication networks supporting multiple-hop relays. That is, an RN may hop through one or more RNs before reaching the Donor BS or Donor node. Therefore, there is a need for switching a backhaul link between a RN and a Donor node. Embodiments of the subject application provide methods and apparatus for backhaul link switching. To facilitate understanding, embodiments of the subject application are provided under specific network architecture and service scenarios, such as 3GPP LTE (Long Term Evolution) Release 8, 3GPP 5G URLLC, 3GPP 5G eMBB, 3GPP 5G mMTC, 3GPP 5G NR (new radio), and onwards. It is contemplated that persons skilled in the art may be aware that, with developments of network architecture and new service scenarios, the embodiments in the subject application are also applicable to solve similar technical problems.

Figure 1:
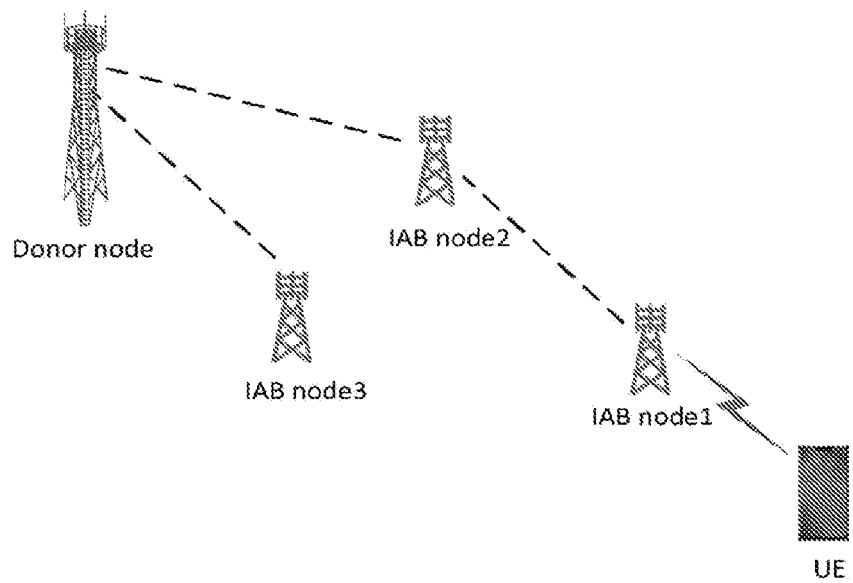
FIG. 1 illustrates a wireless communication system according to some embodiments of the subject application.

FIG. 1 illustrates a wireless communication system according to some embodiments of the subject application. Although a wireless communication system illustrated in FIG. 1 includes a BS or a Donor node (e.g. an IAB donor node), three RNs (e.g., IAB node1, IAB node2, and IAB node3), and one UE served by IAB node1 for simplicity, it is, however, also contemplated that the wireless communication system in FIG. 1 may include more or less node(s) or device(s), e.g. more or less BS(s), RN(s) or UE(s). Furthermore, although FIG. 1 depicts that IAB node1 is connected to a single UE, all other nodes, for example the Donor node, IAB node1, IAB node2, and IAB node3, are capable of providing and supporting connections to multiple UEs simultaneously.

In a wireless communication system of FIG. 1, IAB node2 and IAB node3 are directly connected to the Donor node providing for two hops between IAB node1 and the Donor node. Namely, IAB node1 hops through IAB node2 before reaching the Donor node. Such a communication link from IAB node1 through IAB node2 to the Donor node is called a backhaul link.

The Donor node in FIG. 1 may be based, for example, on the standards of long-term evolution (LTE), LTE-Advanced (LTE-A), new radio (NR), or other suitable standards. For some examples, the Donor node may be an eNB or a gNB, and may define one or more cells. For some examples, the Donor node may be referred to as an IAB Donor node.

A UE in FIG. 1 may represent a computing device, a wearable device, or a mobile device, etc. It is contemplate that as the 3GPP (3rd Generation Partnership Project) and the communication technology develop, the terminologies recited in the specification may change, which should not affect the principle of the subject application.

In a wireless communication system, a multiple-hop (i.e., multi-hop) backhaul link may be referred to as multiple-hop backhauling scheme, and a single-hop backhaul link may be referred to as single-hop backhauling scheme. A single-hop backhaul scheme could be considered as a special case of a multiple-hop backhauling scheme. Multiple-hop backhauling scheme provides more range extension than a single-hop backhaul link. According to embodiment of FIG. 1, a UE communicates with the Donor node relayed by IAB node1 and IAB node2. This is especially beneficial for above-6 GHz frequencies due to their limited range. A multiple-hop backhauling scheme further enables and enhances communication around obstacles, for example, buildings in urban environment for in-clutter deployments.

A wireless backhaul link is vulnerable to blockage (e.g. a moving object (e.g. a vehicle), environmental/seasonal change (e.g. foliage), change of infrastructure (e.g. a new building), etc. Also, traffic variations can create uneven load distribution on wireless backhaul links, and the uneven load distribution may subsequently cause congestion on a local link or a local node. A hop node may be employed in a wireless communication system to address the above issues. The number of hop nodes deployed in a wireless communication system may be determined by, for example but is not limited to, signal frequency, cell density, propagation environment, traffic load, etc. For example, according to the embodiment of FIG. 1, IAB node1 may switch to IAB node3 from IAB node2, if a backhaul link from IAB node1 through IAB node2 to the Donor node is blocked by moving objects.

Although deployment of hop node(s) may provide design flexibility in a wireless communication system, however, relatively more hop nodes within a wireless communication system may raise another issue (e.g. scalability, degradation of communication quality/performance, traffic congestion, reliability of backhaul link, signaling overload/signaling overhead, load balance between multiple backhaul links, etc.).

Topology adaptation refers to procedures that autonomously reconfigure the backhaul network architecture under circumstances such as blockage or local congestion without discontinuing services for UEs.

A switch operation (e.g. a backhaul link switch operation) for a Donor node (e.g., IAB donor node) in a wireless communication system may be performed under at least two cases/conditions as described below, specifically:

Case/Condition 1: Donor node knows the topology structure of the wireless network (in the wireless communication system) including all the involved IAB nodes.

Case/Condition 2: Donor node only knows an IAB node (e.g. a parent node or a child node) which directly communicates with the Donor node. In other words, the Donor node only knows a first hop node in the wireless communication system.

As shown in FIG. 1, under Case 2, there is no direct RRC signaling between Donor node and IAB node1, and IAB node1 is controlled by IAB node2.

Embodiments of the subject application propose technical solutions that may possess the following advantages in new generation communication systems, such as 5G communication systems: (1) under Case/Condition 1, to make Donor node know the topology structure of the wireless network; (2) under both Cases/Conditions 1 and 2, to transmit or include new factors (detailed in the description and accompanying drawings below) in a measurement results report; (3) under Case/Condition 2, to have a criteria to determine data transmission of an IAB node for switch operation; and/or, (4) under Cases/Conditions 1 and 2, to set up a specific procedure of backhaul link switching. More details on the embodiments of the subject application are illustrated in the following text in combination with the appended drawings.

Figure 2:
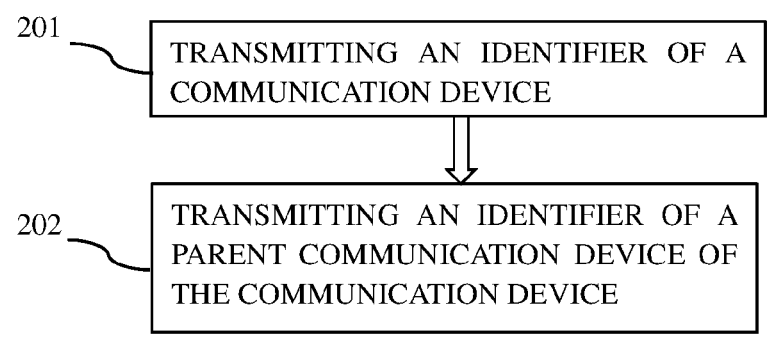
FIG. 2 illustrates steps performed by a communication device when transmitting information according to some embodiments of the subject application.

FIG. 2 illustrates steps performed by a communication device when transmitting information according to some embodiments of the subject application. In some embodiments, the steps shown in FIG. 2 can be performed by an IAB node, for example, IAB node1 as shown in FIG. 1.

In block 201 of FIG. 2, an identifier (ID) of a communication device is transmitted. In block 202 of FIG. 2, an ID of a parent communication device of the communication device is transmitted.

In some examples, an ID of a communication device and an ID of a parent communication device of the communication device are transmitted simultaneously. In some examples, an ID of a communication device and an ID of a parent communication device of the communication device are transmitted separately or individually.

In some examples, under the network architecture of FIG. 1, an ID of IAB node1 and an ID of IAB node2, which is a parent IAB node of IAB node1, are transmitted to a Donor node. In some examples, an ID of IAB node3 is also transmitted to the Donor node. Since IAB node3 is directly connected to the Donor node, there is no parent node of IAB node3 in the network architecture of FIG. 1. Thus, from IAB node3 perspective, only ID information of IAB node3 needs to be transmitted to the Donor node. Similarly, since IAB node2 is directly connected to the Donor node, there is no parent node of IAB node2 in the network architecture of FIG. 1, and thus, only an ID of IAB node2 is transmitted to the Donor node.

After transmitting the ID of IAB node1 and the ID of IAB node2, topology information regarding the backhaul link from IAB node1 through IAB node2 can be identified. After transmitting the ID of IAB node3, topology information regarding IAB node3 side can also be identified. In particular, in response to transmitting information related to IDs of all RNs (i.e., IAB nodes 1, 2, and 3) in the network architecture, a topology of the whole network architecture may be determined.

Figure 3:
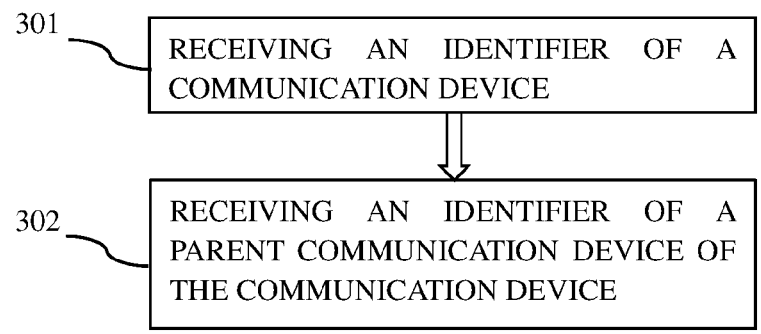
FIG. 3 illustrates steps performed by a communication device when receiving information according to some embodiments of the subject application.

FIG. 3 illustrates steps performed by a communication device when receiving information according to some embodiments of the subject application. In some embodiments, the steps shown in FIG. 3 can be performed by an IAB node or a Donor node as shown in FIG. 1.

In block 301 of FIG. 3, an identifier (ID) of a communication device is received. In block 302 of FIG. 3, an identifier of a parent communication device of the communication device is received.

In some examples, an ID of the communication device and an ID of a parent communication device of the communication device are received simultaneously. In some examples, an ID of the communication device and an ID of a parent communication device of the communication device are received separately or individually.

In some examples, under the network architecture of FIG. 1, the Donor node receives an ID of IAB node1 and an ID of IAB node2, which is a parent IAB node of IAB node1. In some examples, the Donor node also receives an ID of IAB node2 or an ID of IAB node3, wherein both the IAB node2 and IAB node3 are directly connected to the Donor node. After receiving the ID of IAB node1 and the ID of IAB node2, the Donor node determines topology information of the backhaul link from IAB node1 through IAB node2. After receiving the ID of IAB node3, the Donor node knows topology information related to IAB node3 side as well. In response to receiving information related to IDs of all RNs (i.e., IAB nodes 1, 2, and 3) in the network architecture, the Donor node may determine and know a topology of the whole network architecture.

According to some embodiments of the subject application, an ID of a first communication device and/or an ID of a parent communication device of the first communication device are transmitted in one message. For some examples, an ID of a first communication device and/or an ID of a parent communication device of the first communication device are transmitted during Radio Resource Control (RRC) connection establishment. For some examples, both IAB node ID and corresponding parent IAB node ID are included in the Msg3, e.g. RRC connection request message.

According to some embodiments of the subject application, the method of transmitting information shown in FIG. 2 further includes receiving measurement configuring information, performing a measurement process according to the measurement configuring information, and transmitting measurement result(s).

According to some embodiments of the subject application, the method of receiving information shown in FIG. 3 further includes transmitting measurement configuring information, and receiving measurement result(s).

In some examples, the measurement configuring information includes: a first threshold value (H1) for a link between a first IAB node and its parent IAB node on a backhaul link, and a second threshold value (H2) for a link between the first IAB node and another IAB node.

According to some embodiments of the subject application, the measurement result(s) includes: a measurement result of a link between a first IAB node and its parent IAB node on a backhaul link, a measurement result of a link between a candidate IAB node on a candidate backhaul link and the first IAB node, or a combination thereof.

For instance, under Case 1, in response to IAB donor node knowing topology information regarding all involved IAB nodes, IAB donor node may configure measurement information for an IAB node. Then, the IAB node may directly report measurement results to IAB donor node.

For another instance, under Case 2, in response to IAB donor node only knowing topology information regarding IAB node(s) which is directly connected to the IAB donor node, a parent IAB node of a child IAB node will configure measurement report(s) for child IAB node. In this scenario, IAB node reports the measurement result(s) to its parent IAB node, and the parent IAB node transmits the measurement result(s) to IAB donor node. Then, the IAB node may indirectly report measurement result(s) to IAB donor node.

According to some embodiments of the subject application, the following information may be included in measurement report(s) to assist IAB donor node to determine whether to perform switching and which target IAB node should be selected:

Measurement results of the serving backhaul link and corresponding IAB node ID and parent IAB node ID.
    Measurement results of a candidate backhaul link and corresponding IAB node ID and/or parent IAB node and/or IAB donor.
    Number of hops of candidate IAB node and corresponding IAB node ID.
    Load information of candidate IAB node and corresponding IAB node ID.

In some examples, under the network architecture of FIG. 1, the serving backhaul link is from IAB node1 through IAB node2 to the Donor node, IAB node3 may be selected as a candidate IAB node of IAB node1, and a candidate backhaul link is from IAB node1 through IAB node3 to the Donor node. First, IAB node1 may report measurement result(s) of the serving backhaul link between IAB node1 and IAB node2, IAB node2 ID, and donor ID (cell ID). Second, IAB node1 may report measurement results of a sub-link of a candidate backhaul link between IAB node1 and IAB node3, IAB node3 ID, and donor ID (cell ID). Third, IAB node1 may report the number/quantity of hops from IAB node3 to the Donor node and IAB node3 ID. Because IAB node3 is directly connected to the Donor node, the number/quantity of hop from IAB node3 to the Donor node is one. Fourth, IAB node1 may report load information of IAB node3 and IAB node3 ID.

According to some embodiments of the subject application, load information of a target IAB node on a candidate backhaul link further includes: utilization information of resources allocated to the target IAB node, the number/ quantity of UEs served by the target IAB node, or a combination thereof. For some examples, under the network architecture of FIG. 1, IAB node1 reports utilization information of resources allocated to IAB node3, and/or the number/quantity of UEs served by the IAB node3.

After receiving the above information reported by the IAB node1, alone or in combination, the Donor node may determine whether IAB node3 could be selected as a target IAB node, and whether to perform switching from the serving backhaul link to the candidate backhaul link.

Under Case 2, IAB donor node only knows IAB node that is directly connected to the IAB donor node. For instance, in the wireless communication system of FIG. 1, there is no direct RRC signaling between IAB donor node and IAB node1, IAB node1 is controlled by its parent IAB node, i.e., IAB node2. The request of IAB node1 switching should be transmitted by IAB node2, because only IAB node2 knows IAB node1. IAB node2 decides whether to transmit the request based on the measurement results from IAB node1.

According to some embodiments of the subject application, if channel quality of a serving backhaul link is worse than a threshold (H1), and channel quality of at least one candidate backhaul link, which is available, is better than a threshold (H2), decision of switching from the serving backhaul link to the candidate backhaul link may be made.

According to some embodiments of the subject application, parent IAB node or IAB donor node will configure a threshold (H1) of backhaul link quality and a threshold (H2) of candidate backhaul link quality.

In some examples, once channel quality of backhaul link (e.g., between IAB node1 and IAB node2) is worse than H1 and channel quality of an available candidate backhaul link (e.g., between IAB node1 and IAB node3) is better than H2, trigger condition of a backhaul link switching process is met, and thus the parent IAB node (e.g., IAB node2) may transmit backhaul link switching indication to the IAB donor node.

In some examples, once channel quality of backhaul link (e.g., between IAB node1 and IAB node2) is worse than H1 and channel quality of an available candidate backhaul link (e.g., between IAB node1 and IAB node3) is better than H2, trigger condition of a backhaul link switching process is met, and thus the IAB donor node may transmit a backhaul link switching request related to IAB node1.

For some examples, under the network architecture of FIG. 1, in response to channel quality of a link between IAB node1 and IAB node2 being lower than a first threshold value (H1) and channel quality of a link between t IAB node1 and IAB node3 being higher than a second threshold value (H2), a backhaul link switching indication or a backhaul link switching request is transmitted.

According to some embodiments of the subject application, the Donor node transmits a backhaul link switching command to an IAB node which plans to switch, and the IAB node performs a backhaul link switching operation. In some examples, the backhaul link switching command indicates information pertinent to a target IAB node on a candidate backhaul link.

According to some embodiments of the subject application, an IAB node performing a backhaul link switching operation includes: the IAB node accessing a target IAB node on a candidate backhaul link, wherein the target IAB node is indicated by a backhaul link switching command.

According to some embodiments of the subject application, a backhaul link switching command includes ID of the target IAB node on a candidate backhaul link, wherein IAB node will access the target IAB node during the backhaul link switching operation.

Embodiments of the subject application propose technical solutions that can also at least solve the following technical problems in the new generation communication systems, such as 5G communication systems:

What information is included in a backhaul link switching request (in some examples, a backhaul link switching request is sent from source IAB donor to target IAB donor)?

What information is included in a backhaul link switching indication (in some examples, a backhaul link switching indication is sent from target IAB donor to target parent IAB node)?

Which node configures the random access (RA) parameters of a target node (for some examples, target IAB donor or target parent IAB node)?

More details on the embodiments of the subject application will be illustrated in the following text in combination with the appended drawings.

Figure 4:
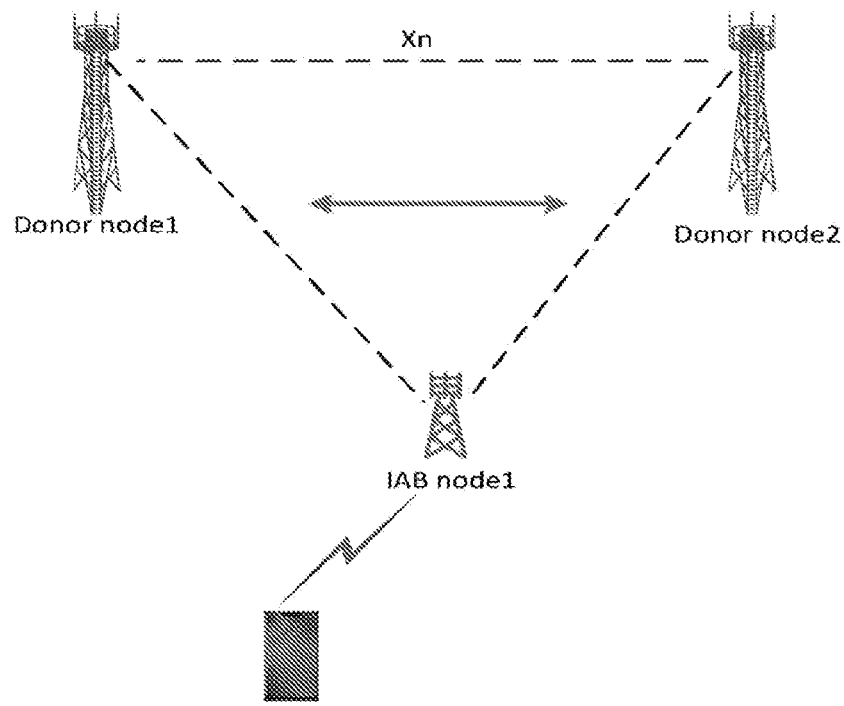
FIG. 4 illustrates a wireless communication system according to some embodiments of the subject application.

FIG. 4 illustrates a wireless communication system according to some embodiments of the subject application. The wireless communication system in FIG. 4 supports single-hop backhaul links. As shown in FIG. 4, IAB node1 directly communicates with both Donor node1 and Donor node2. The embodiments of FIG. 4 may carry out a backhaul link switching scheme between singe-hop links with donor change.

In the wireless communication system shown in FIG. 4, there is a backhaul link formed between IAB node1 and Donor node 1. In the wireless communication system shown in FIG. 4, there is another backhaul link formed between IAB node1 and Donor node 2. For example, in response to degradation or failure of signal transmission on a backhaul link (e.g. a backhaul link formed between IAB node1 to Donor node1), IAB node1 may select and switch to another backhaul link (e.g. another backhaul link formed between IAB node1 and Donor node 2) for signal transmission.

Since two backhaul links of IAB node1 refer to two different Donor nodes, i.e., Donor node1 and Donor node2, a backhaul link switching procedure of IAB node1 in FIG. 4 causes donor change between Donor node1 and Donor node2. An exemplary procedure of backhaul link switching in the wireless communication system of FIG. 4 is described in FIG. 7.

Figure 5:
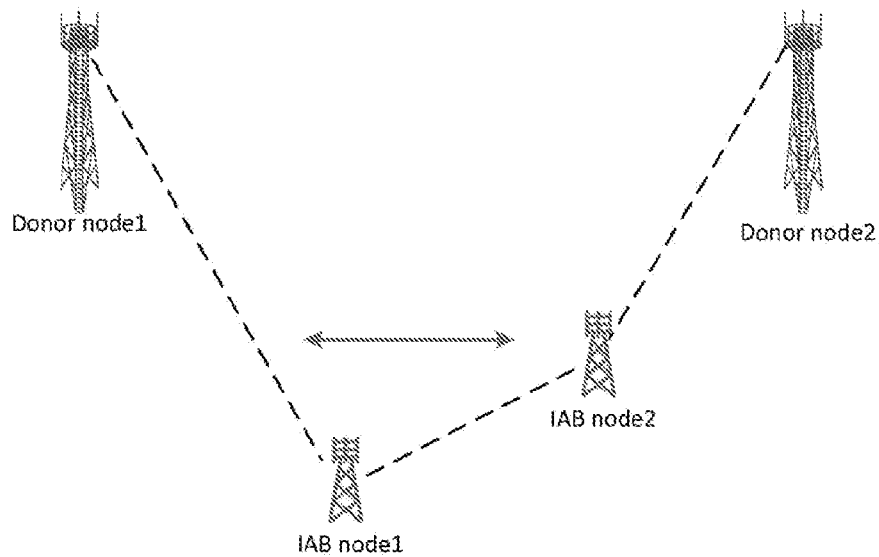
FIG. 5 illustrates a wireless communication system according to some embodiments of the subject application.

FIG. 5 illustrates a wireless communication system according to some embodiments of the subject application. The wireless communication system in FIG. 5 supports both single-hop and multi-hop backhaul links. The embodiments of FIG. 5 may carry out a backhaul link switching scheme between single-hop link and multi-hop link with donor change.

As shown in FIG. 5, one backhaul link is from IAB node1 to Donor node1, and another backhaul link is from IAB node1 through IAB node2 to Donor node2. For example, in response to degradation or failure of signal transmission on a backhaul link (e.g. a backhaul link formed between IAB node1 to Donor node1), IAB node1 may select to switch to another backhaul link (e.g. another backhaul link formed between IAB node1, IAB node2, and Donor node2) for signal transmission. In another example, in response to degradation or failure of signal transmission on a backhaul link (e.g. a backhaul link formed between IAB node1, IAB node2, and Donor node2), IAB node1 may select to switch to another backhaul link (e.g. another backhaul link formed between IAB node1 to Donor node1) for signal transmission.

Similar to FIG. 4, a backhaul link switching procedure of IAB node1 in FIG. 5 will cause donor change between Donor node1 and Donor node2. An exemplary procedure of backhaul link switching in the wireless communication system of FIG. 5 is described in FIG. 7.

Figure 6:
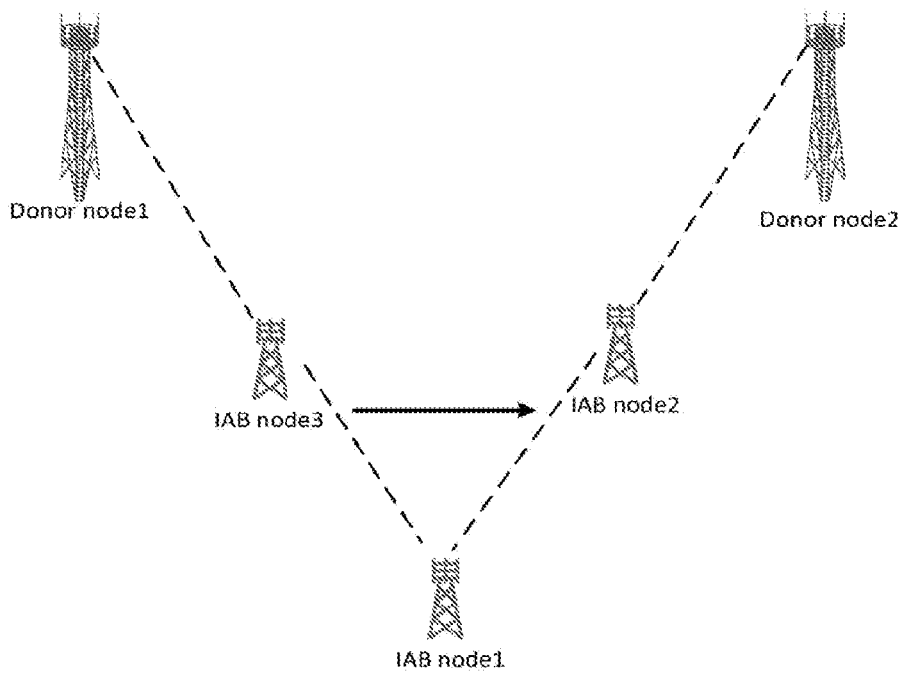
FIG. 6 illustrates a wireless communication system according to some embodiments of the subject application.

FIG. 6 illustrates a wireless communication system according to some embodiments of the subject application. The wireless communication system in FIG. 6 supports multi-hop backhaul links. The embodiments of FIG. 6 may carry out a backhaul link switching scheme between multi-hop links with donor change.

As shown in FIG. 6, one backhaul link is from IAB node1 through IAB node3 to Donor node1, and another backhaul link is from IAB node1 through IAB node2 to Donor node2. For example, in response to degradation or failure of signal transmission on a backhaul link (e.g. a backhaul link formed between IAB node1, IAB node3, to Donor node1), IAB node1 may select to switch to another backhaul link (e.g. another backhaul link formed between IAB node1, IAB node2, and Donor node2) for signal transmission. In another example, in response to degradation or failure of signal transmission on a backhaul link (e.g. a backhaul link formed between IAB node1, IAB node2, and Donor node2), IAB node1 may select to switch to another backhaul link (e.g. another backhaul link formed between IAB node1, IAB node3, to Donor node1) for signal transmission.

Similar to FIGS. 4 and 5, a backhaul link switching procedure of IAB node1 in FIG. 6 will also cause donor change between Donor node1 and Donor node2. An exemplary procedure of backhaul link switching in the wireless communication system of FIG. 6 is described in FIG. 7.

Figure 7:
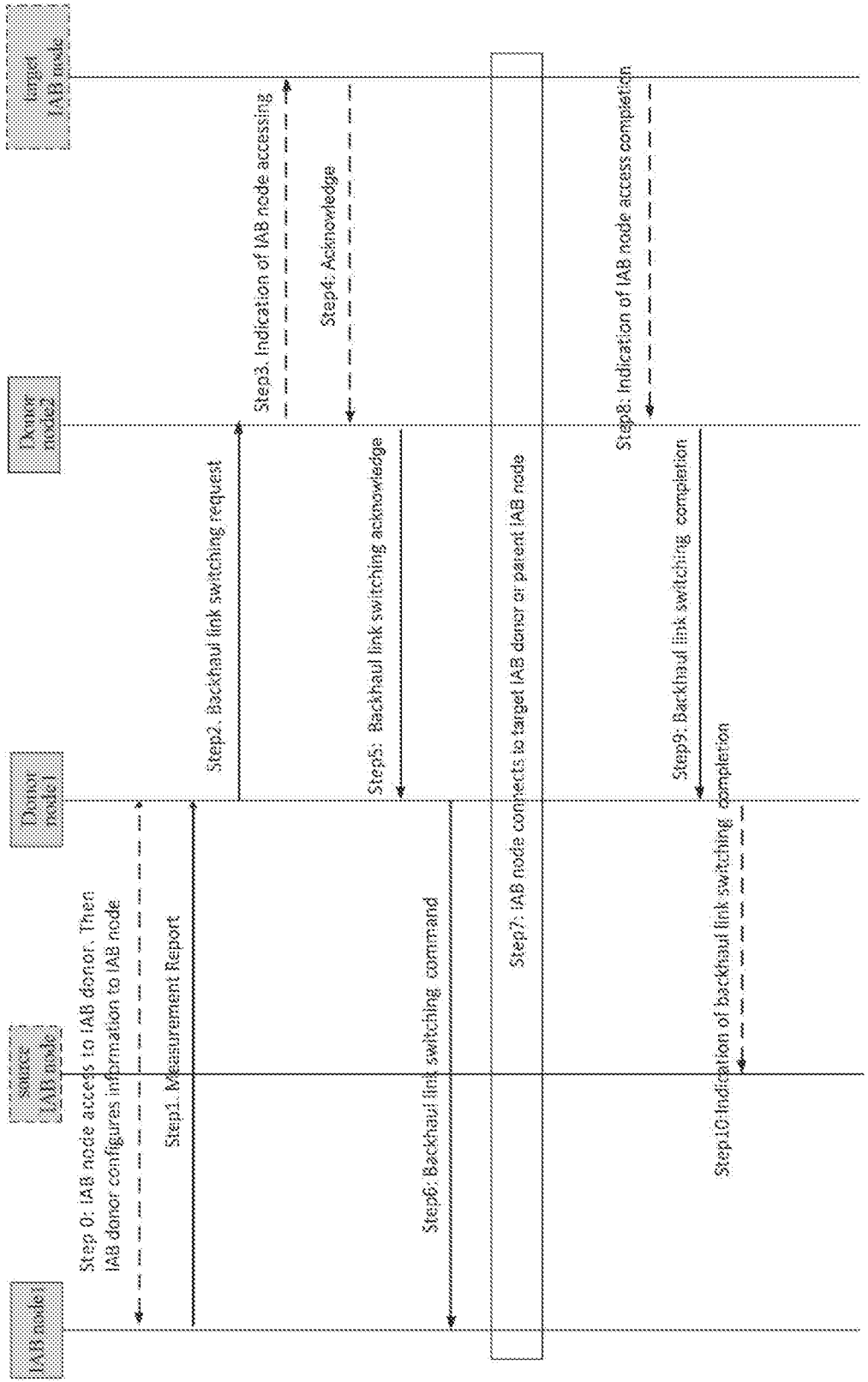
FIG. 7 illustrates an exemplary procedure of backhaul link switching with donor change according to some embodiments of the subject application.

FIG. 7 illustrates an exemplary procedure of backhaul link switching with donor change according to some embodiments of the subject application.

The procedure shown in FIG. 7 may be carried out under condition(s) in Case 1. This procedure of backhaul link switching with donor change may be applied to any one of wireless communication systems as shown in FIGS. 4-6.

In the wireless communication system as shown in FIG. 6, IAB node1 may access Donor node1 via IAB node3, which is a parent node of IAB node1. IAB node1 may also access Donor node2 via IAB node2, which is a parent node of IAB node1. During a backhaul link switching operation with respect to IAB node1, IAB node3 may function as a source IAB node as shown in FIG. 7, and IAB node2 may function as a target IAB node in FIG. 7. In addition, Donor node 1 shown in FIG. 6 and FIG. 7 may function as a source IAB donor, and Donor node 2 shown in FIG. 6 and FIG. 7 may function as a target IAB donor. Hence, signaling flows as shown in FIG. 7 may be applied to the wireless communication system as shown in FIG. 6.

According to some embodiments of the subject application, both source IAB node (i.e., IAB node3 as shown in FIG. 6) and target IAB node (i.e., IAB node2 as shown in FIG. 6) in FIG. 6 are optional. Comparing with FIG. 6, FIG. 4 shows a wireless communication system without IAB node3 and IAB node2, and FIG. 5 shows a wireless communication system without IAB node3. Accordingly, the procedure of backhaul link switching with donor change shown in FIG. 7 also can be applied to FIGS. 4 and 5.

As illustrated in FIG. 7, optional entities of source IAB node and target IAB node and optional steps of the procedure of backhaul link switching with donor change are marked as dashed.

In Step 0 of FIG. 7, IAB node1 accesses Donor node1, and then Donor node1 transmits configuring information to IAB node1.

According to some embodiments of the subject application, IAB node1 accesses Donor node1 via a random access (RA) procedure, Donor node1 is the serving donor for the IAB node1, and then Donor node1 transmits configuring information to IAB node1. For instance, configuring information transmitted by Donor node1 includes measurement configuring information for IAB node1. As described in the foregoing paragraphs of the subject application, in some examples, after receiving measurement configuring information, IAB node1 may perform a measurement process according to the measurement configuring information and then transmits measurement result(s).

According to some embodiments of the subject application, for IAB node1 that is connected to Donor node1 via multi-hop interface, both IDs of IAB node1 and of a parent IAB node (e.g., source IAB node as shown in FIG. 7) of IAB node1 are transmitted during RRC connection establishment. For some examples, both IAB node1 ID and corresponding parent IAB node ID (i.e., source IAB node ID) are included in the Msg3, e.g. RRC connection request message.

In some examples, the measurement configuring information for IAB node1 is transmitted by Donor node1, then, relayed by parent IAB node (i.e., source IAB node) of IAB node1, and finally reaches IAB node1.

In Step 1 of FIG. 7, IAB node reports measurement result(s) and other assistant information to Donor node1.

According to some embodiments of the subject application, a report(s) including a measurement result(s) of IAB node1 may include: measurement results of the serving backhaul link and IAB node1 ID and parent IAB node ID (i.e., source IAB node ID); measurement results of a candidate backhaul link, a candidate target IAB node ID, and/or an ID of a parent IAB node of the candidate target IAB node, and/or IAB donor of the candidate backhaul link; number/quantity of hops of the candidate target IAB node and the candidate target IAB node ID; load information of the candidate target IAB node and the candidate target IAB node ID, or a combination thereof.

After receiving the measurement result(s) of IAB node1, Donor node1 may determine whether to initiate a backhaul link switching procedure and which target IAB node should be selected during backhaul link switching. In some examples, Donor node1, assisted by the measurement result(s), decides to initiate a backhaul link switching procedure and selects Donor node2 as a target IAB donor for IAB node1.

In Step 2 of FIG. 7, Donor node1 transmits Backhaul link switching request to Donor node2 (i.e., target IAB donor) once Donor node1 decides to initiate backhaul link switching based on the measurement results.

According to some embodiments of the subject application, a backhaul link switching request may include: ID of IAB node1 which plans to switch; ID of a UE(s) served by IAB node1; corresponding context of the UE(s) served by IAB node1; measurement result(s) of a link between a candidate target IAB node (i.e., a candidate parent IAB node) on a candidate backhaul link and IAB node1, ID of the candidate target IAB node on the candidate backhaul link, or a combination thereof.

In Step 3 of FIG. 7, Donor node2 (i.e., target IAB donor) transmits an IAB node accessing indication to a target IAB node (e.g., IAB node2), to notify that a new IAB node (e.g., IAB node1) will connect to the target IAB node.

According to some embodiments of the subject application, the target IAB node receives accessing indication which may include, among other things, an indication of backhaul link switching, ID of a new IAB node (e.g., IAB node1) which plans to switch, or a combination thereof.

In Step 4 of FIG. 7, if the target IAB node (e.g., IAB node2) is available, the target IAB node transmits Acknowledge information to Donor node2, to confirm accepting the subsequent backhaul link switching process.

According to some embodiments of the subject application, Acknowledge information transmitted by the target IAB node may include RA parameter(s). For some examples, the RA parameter(s) includes time resource for RA, frequency resource for RA, a dedicated preamble, or a combination thereof.

In Step 5 of FIG. 7, in response to resource(s) in Donor node2 being available, Donor node2 (i.e., a target IAB donor) replies to Donor node1 by transmitting a backhaul link switching Acknowledge information.

According to some embodiments of the subject application, a backhaul link switching Acknowledge information may include: ID of the target IAB node (e.g., IAB node2), RA parameter(s) transmitted from the target IAB node, or a combination thereof.

In Step 6 of FIG. 7, Donor node1 transmits backhaul link switching command to IAB node1.

According to some embodiments of the subject application, backhaul link switching command may include: the ID of the target IAB node, RA parameter(s) transmitted from the target IAB node, or a combination thereof.

In Step 7 of FIG. 7, after receiving the backhaul link switching command, IAB node1 connects to Donor node2 (i.e., a target IAB donor) or target IAB node under different scenarios.

Specifically, under the network architecture as shown in FIG. 5, in some examples, a backhaul link is from IAB node1 through IAB node2 to Donor node2 (i.e., the source IAB donor), and a candidate backhaul link is from IAB node1 to Donor node1 (i.e., the target IAB donor). Thus, receiving the backhaul link switching command from Donor node2, IAB node1 connects to Donor node1 which functions as a target IAB donor (Donor node2 as shown in FIG. 7).

Under the network architecture as shown in the FIG. 6, in some examples, Donor node2 functions as a source IAB donor, IAB node2 functions as a source IAB node, Donor node1 functions as a target IAB donor, and IAB node3 functions as a target IAB node. Thus, receiving the backhaul link switching command from Donor node2 (source IAB donor), IAB node1 connects to IAB node3 which functions a target IAB node.

In Step 8 of FIG. 7, after IAB node1 connecting to the target IAB node, the target IAB node transmits an indication of IAB node access completion to Donor node2 (i.e., the target IAB donor).

According to some embodiments of the subject application, an indication of IAB node access completion may include new IAB node ID (i.e., IAB node1 ID). For instance, under the network architecture as shown in FIG. 6, an indication of IAB node access completion, which is transmitted from IAB node2 (i.e., the target IAB node) to Donor node2 (i.e., the target IAB donor), includes the ID of IAB node1 that has successfully accessed IAB node2.

In Step 9 of FIG. 7, Donor node2 transmits backhaul link switching completion information to Donor node1, after IAB node1 successfully connecting to Donor node2 or the target IAB node under different scenarios described.

In Step 10 of FIG. 7, Donor node1 transmits backhaul link switching completion information to the source IAB node (if any).

Specifically, under the network architecture as shown in FIG. 6, in some examples, Donor node1 functions as a source IAB donor, and IAB node3 functions as a source IAB node. Thus, after receiving backhaul link switching completion information from Donor node2, Donor node1 transmits the backhaul link switching completion information to IAB node3 (i.e., the source IAB node).

According to some embodiments of the subject application, the backhaul link switching completion information may include ID of IAB node1 which has successfully accessed target IAB donor (e.g., Donor node2) or target IAB node.

According to some embodiments of the subject application, after receiving backhaul link switching completion information from Donor node1, the source IAB node releases resources allocated to IAB node1, which has successfully accessed target IAB donor (e.g., Donor node2) or target IAB node.

Figure 8:
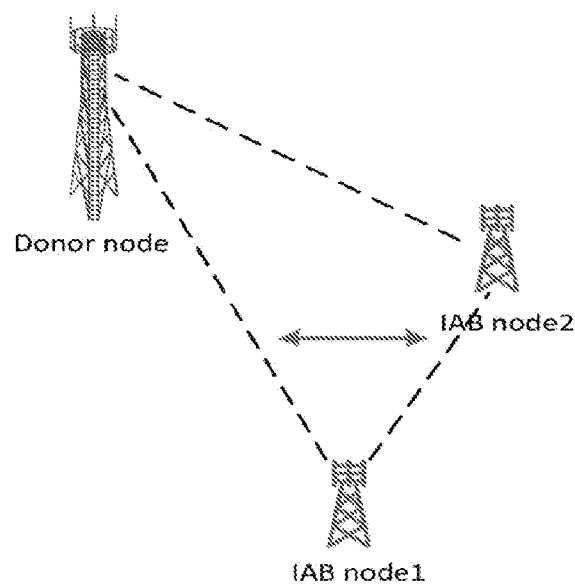
FIG. 8 illustrates a wireless communication system according to some embodiments of the subject application.

FIG. 8 illustrates a wireless communication system according to some embodiments of the subject application. The embodiments depicted in FIG. 8 may carry out a backhaul link switching scheme between singe-hop link and multi-hop link with Donor node unchanged.

As shown in FIG. 8, one backhaul link is from IAB node1 to Donor node, and another backhaul link is from IAB node1 through IAB node2 to Donor node. For example, in response to degradation or failure of signal transmission on a backhaul link (e.g. a backhaul link formed between IAB node1 to Donor node), IAB node1 may select to switch to another backhaul link (e.g. another backhaul link formed between IAB node1, IAB node2, and Donor node) for signal transmission. Alternatively, for example, in response to degradation or failure of signal transmission on a backhaul link (e.g. a backhaul link formed between IAB node1, IAB node2, and Donor node), IAB node1 may select to switch to another backhaul link (e.g. another backhaul link formed between IAB node1 to Donor node) for signal transmission.

As can be seen from FIG. 8, a backhaul link switching process of IAB node1 will not cause donor change. An exemplary procedure of backhaul link switching in the wireless communication system of FIG. 8 is described in FIG. 10.

Figure 9:
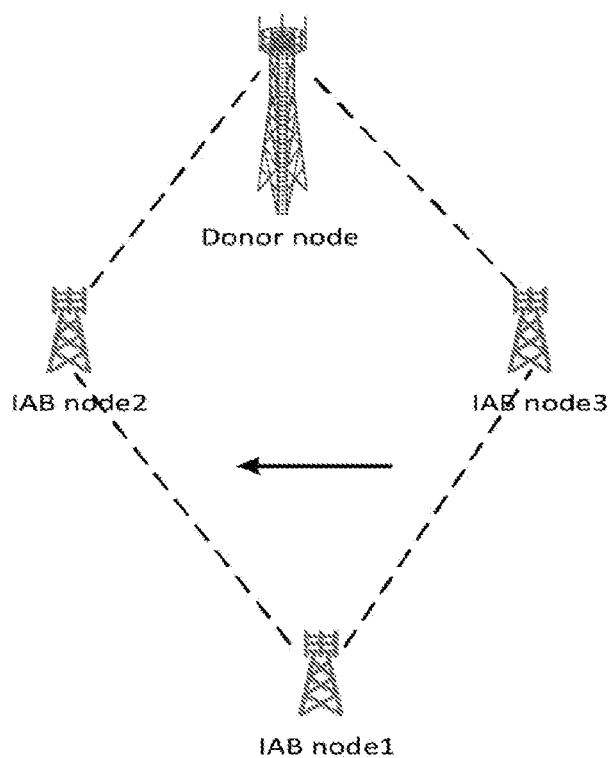
FIG. 9 illustrates a wireless communication system according to some embodiments of the subject application.

FIG. 9 illustrates yet another wireless communication system according to some embodiments of the subject application. The embodiment depicted in FIG. 9 may carry out a backhaul link switching scheme between multi-hop backhaul links with Donor node unchanged.

As shown in FIG. 9, one backhaul link is from IAB node1 through IAB node2 to Donor node, and another backhaul link is from IAB node1 through IAB node3 to Donor node. For example, in response to degradation or failure of signal transmission on a backhaul link (e.g. a backhaul link formed between IAB node1, IAB node3, to Donor node), IAB node1 may select to switch to another backhaul link (e.g. another backhaul link formed between IAB node1, IAB node2, and Donor node) for signal transmission. Alternatively, for example, in response to degradation or failure of signal transmission on a backhaul link (e.g. a backhaul link formed between IAB node1, IAB node2, and Donor node), IAB node1 may select to switch to another backhaul link (e.g. another backhaul link formed between IAB node1, IAB node3, to Donor node) for signal transmission.

Similar to FIG. 8, a backhaul link switching process of IAB node1 in the wireless communication system of FIG. 9 will not cause Donor node change. An exemplary procedure of backhaul link switching in the wireless communication system of FIG. 9 is described in FIG. 10.

Figure 10:
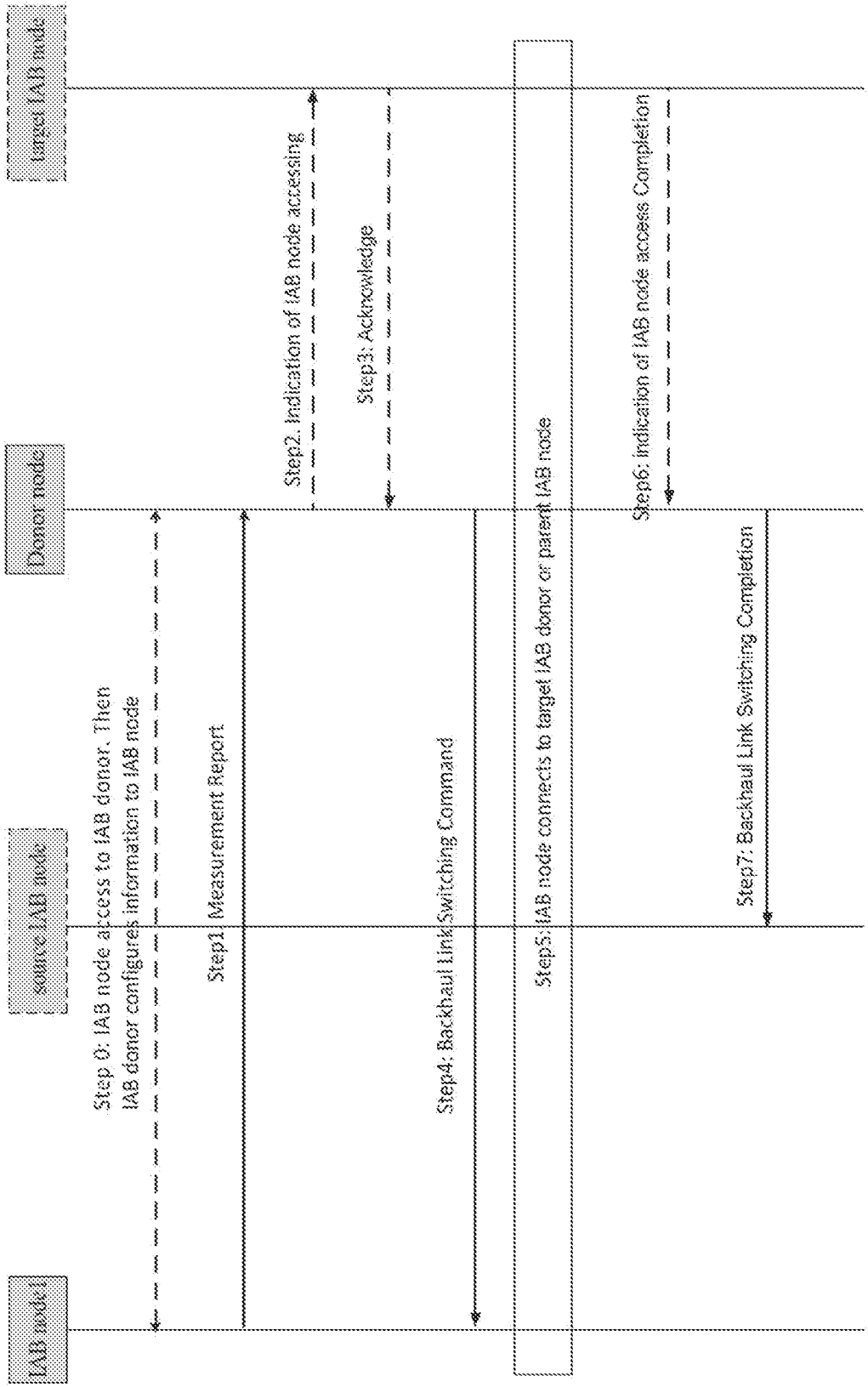
FIG. 10 illustrates an exemplary procedure of backhaul link switching with donor unchanged according to some embodiments of the subject application.

FIG. 10 illustrates an exemplary procedure of backhaul link switching with donor unchanged according to some embodiments of the subject application.

The procedure shown in FIG. 10 may be carried out under condition(s) in Case 1. This procedure of backhaul link switching with donor unchanged may be applied to any one of wireless communication systems as shown in FIGS. 8 and 9.

The embodiments of FIG. 10 clearly show signaling flows between IAB node1, source IAB node (e.g., IAB node3), Donor node, and target IAB node (e.g., IAB node2). Similar to the embodiments of FIG. 7, optional entities of source IAB node and target IAB node and optional steps in the procedure of backhaul link switching shown in FIG. 10 are also marked as dashed.

In Step 0 of FIG. 10, Donor node which is the serving donor transmits configuring information to IAB node1. For instance, configuring information transmitted by Donor node includes measurement configuring information for IAB node1. In some examples, the configuring information for IAB node1 is transmitted from Donor node, relayed by source IAB node (i.e., parent IAB node) of IAB node1, and finally reaches IAB node1.

In Step 1 of FIG. 10, IAB node1 reports the measurement result and other assistant information to Donor node. According to some embodiments of the subject application, such report(s) including the measurement result(s) of IAB node1 may include: measurement results of the serving backhaul link, IAB node1 ID, and an ID of a parent IAB node of IAB node1; measurement results of a candidate backhaul link, an ID of a candidate target IAB node, and/or an ID of a parent IAB node of the candidate target IAB node, and/or IAB donor of the candidate backhaul link; number/quantity of hops of candidate target IAB node and the candidate target IAB node ID, load information of the candidate target IAB node and the candidate target IAB node ID, or a combination thereof.

In Step 2 of FIG. 10, Donor node indicates to a target IAB node of IAB node1 access. In Step 3 of FIG. 10, if the target IAB node (e.g., IAB node2) is available, the target IAB node transmits Acknowledge information to Donor node, to confirm accepting the subsequent backhaul link switching process. In Step 4 of FIG. 10, Donor node transmits backhaul link switching command to IAB node1. In Step 5 of FIG. 10, IAB node1 connects to the target IAB node once receiving the backhaul link switching command. In Step 6 of FIG. 10, the target IAB node transmits an indication of IAB node access completion to Donor node. In Step 7 of FIG. 10, Donor node transmits backhaul link switching completion information to source IAB node (if any).

All embodiments described in the subject application, for example, all embodiments described for FIG. 7, are applicable for the procedure of FIG. 10.

Figure 11:
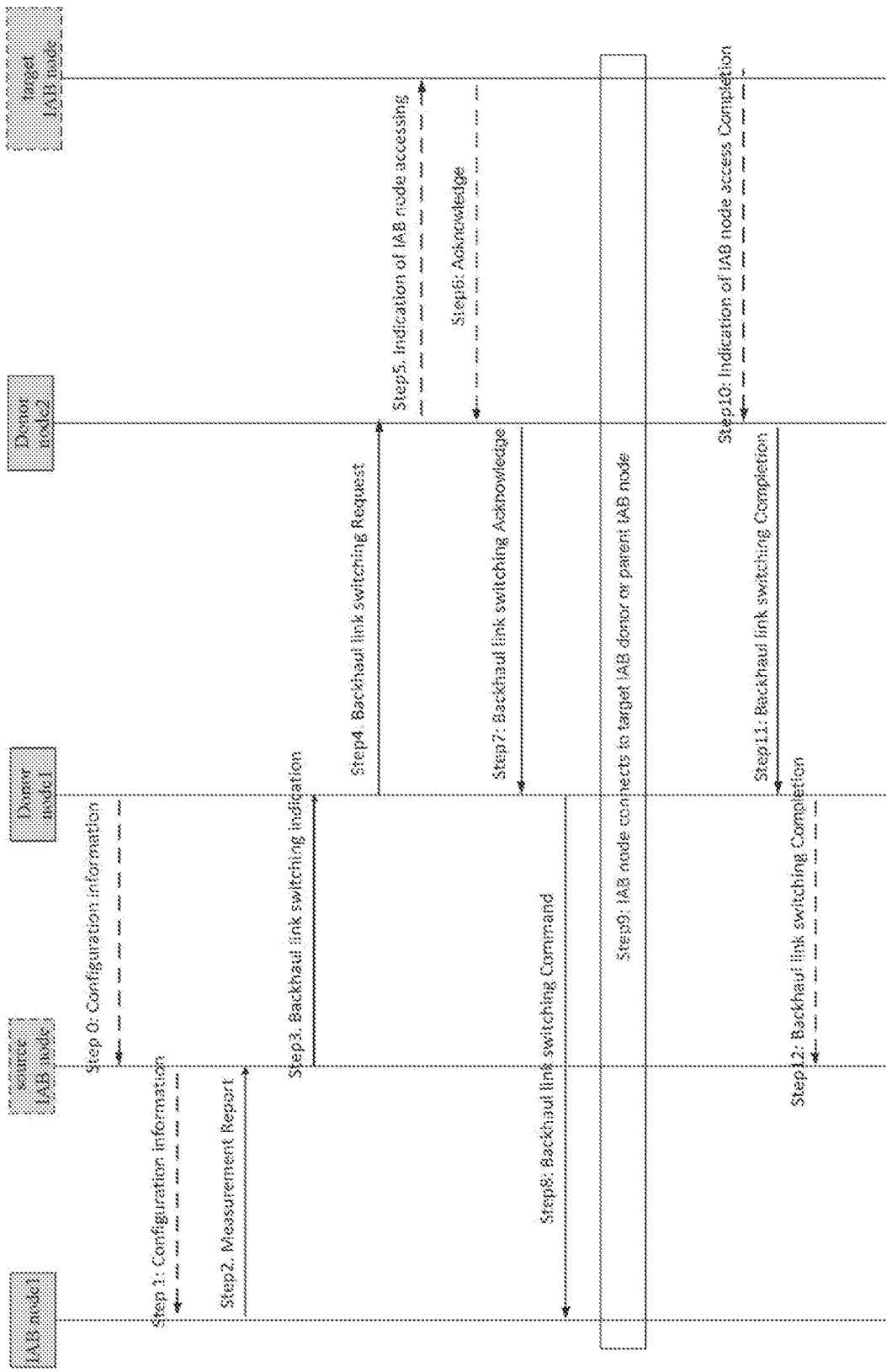
FIG. 11 illustrates an exemplary procedure of backhaul link switching with donor change according to some embodiments of the subject application.

FIG. 11 illustrates an exemplary procedure of backhaul link switching with donor change according to some embodiments of the subject application.

The procedure shown in FIG. 11 may be carried out under condition(s) in Case 2. The embodiments of FIG. 11 clearly show signaling flows between IAB node1, source IAB node (e.g., IAB node2), Donor node1 (i.e., source donor node), Donor node2 (i.e., target donor node), and target IAB node (e.g., IAB node3). Similar to the embodiments of FIGS. 7 and 10, optional entities of source IAB node and target IAB node and optional steps in the procedure of backhaul link switching shown in FIG. 11 are also marked as dashed.

In Step 0 of FIG. 11, Donor node1, which is the serving donor of IAB node1, transmits configuration information to source IAB node (e.g., IAB node2). In Step 1 of FIG. 11, source IAB node transmits configuration information to IAB node1.

For instance, configuring information transmitted by the serving Donor node1 includes measurement configuring information for the IAB node1. In some examples, the configuring information for the IAB node1 is transmitted from the serving Donor node1, relayed by source IAB node (i.e., parent of IAB node) and finally reaches IAB node1.

According to some embodiments of the subject application, Donor node1 or source IAB node will configure a threshold (H1) of backhaul link quality and a threshold (H2) of candidate backhaul link quality.

In some examples, once channel quality of backhaul link between IAB node1 and source IAB node is worse than H1 and channel quality of an available candidate backhaul link (e.g., between IAB node1 and IAB node3) is better than H2, trigger condition of a backhaul link switching process is met, and thus the source IAB node (i.e., the parent IAB node) may transmit backhaul link switching indication to Donor node1.

In some examples, once channel quality of backhaul link between IAB node1 and source IAB node is worse than H1 and channel quality of an available candidate backhaul link (e.g., between IAB node1 and IAB node3) is better than H2, trigger condition of a backhaul link switching process is met, and thus the Donor node1 may transmit a backhaul link switching request related to IAB node1. For instance, Donor node1 may transmit a backhaul link switching request related to IAB node1 to Donor node2.

In Step 2 of FIG. 11, IAB node1 reports the measurement result and other assistant information to the source IAB node. According to some embodiments of the subject application, a report(s) including the measurement result(s) of IAB node1 may include: measurement results of the serving backhaul link, IAB node1 ID, and an ID of a parent IAB node (e.g., IAB node2) of IAB node1; measurement results of a candidate backhaul link, a candidate target IAB node ID, and/or an ID of a parent IAB node of the candidate target IAB node, and/or IAB donor of the candidate backhaul link; number/quantity of hops of candidate target IAB node and candidate target IAB node ID, load information of candidate target IAB node and candidate target IAB node ID, or a combination thereof.

In Step 3 of FIG. 11, the source IAB node transmits a backhaul link switching indication to Donor node1 (i.e., source donor node) once the trigger condition of a backhaul link switching process is met as described in Steps 0 and 1 of FIG. 11.

According to some embodiments of the subject application, a backhaul link switching indication may include: ID of IAB node1 which plans to switch; ID of a UE(s) served by the IAB node1; measurement result(s) of a link between a candidate target IAB node on a candidate backhaul link and the IAB node1, ID of the candidate target IAB node on the candidate backhaul link, Donor node2 of the candidate backhaul link, or a combination thereof.

In Step 4 of FIG. 11, Donor node1 transmits a backhaul link switching request to Donor node2 once the Donor node1 decides to perform backhaul link switching process based on the measurement results.

According to some embodiments of the subject application, a backhaul link switching request may include: ID of the IAB node1 which plans to switch; ID of a UE(s) served by the IAB node1; corresponding context of the UE(s) served by the IAB node1; measurement result(s) of a link between a candidate target IAB node on a candidate backhaul link and the IAB node1, ID of the candidate target IAB node on the candidate backhaul link, or a combination thereof.

In Step 5 of FIG. 11, Donor node2 provides indication of new IAB node access to a target IAB node. In Step 6 of FIG. 11, the target IAB node transmits Acknowledge information to Donor node2. In Step 7 of FIG. 11, Donor node2 transmits backhaul link switching Acknowledge information to Donor node1 if resource(s) in Donor node2 is available. In Step 8 of FIG. 11, Donor node1 transmits a backhaul link switching command to the IAB node1. In Step 9 of FIG. 11, after receiving the backhaul link switching command, the IAB node1 connects to Donor node2 or the target IAB node under different scenarios. In Step 10 of FIG. 11, the target IAB node transmits an indication of IAB node access completion to Donor node2. In Step 11 of FIG. 11, Donor node2 transmits backhaul link switching completion information to Donor node1, after IAB node1 successfully connecting to Donor node2 or target IAB node under different scenarios. In Step 12 of FIG. 11, Donor node1 transmits the backhaul link switching completion information to the source IAB node (if any).

All embodiments described in the subject application, for example, all embodiments described for FIGS. 7 and 10, are applicable for the procedure of FIG. 11.

Figure 12:
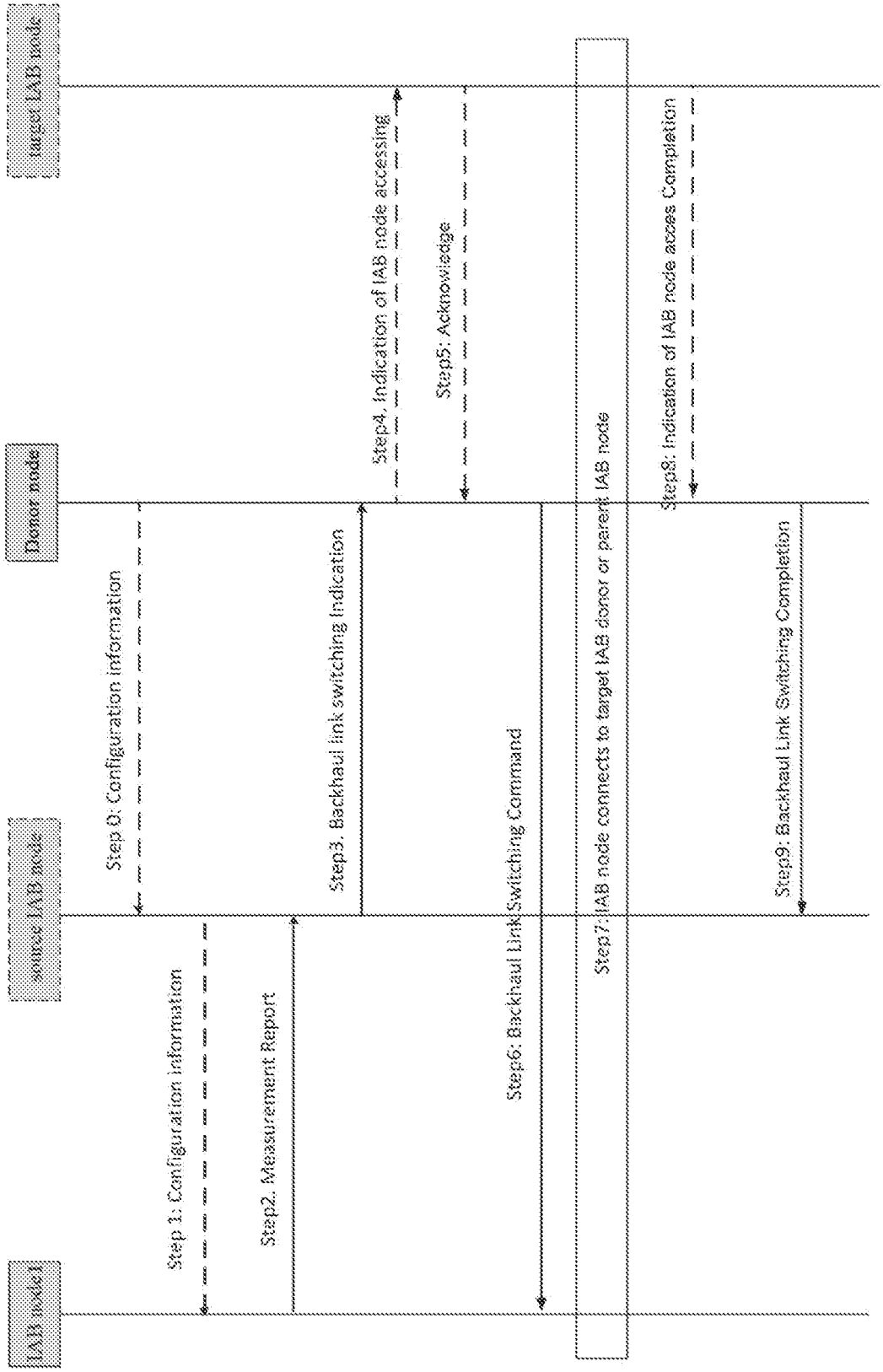
FIG. 12 illustrates an exemplary procedure of backhaul link switching with donor unchanged according to some embodiments of the subject application.

FIG. 12 illustrates an exemplary procedure of backhaul link switching with donor unchanged according to some embodiments of the subject application.

The procedure shown in FIG. 12 may be carried out under condition(s) in Case 2. The procedure of FIG. 12 clearly show signaling flows between IAB node1, source IAB node (e.g., IAB node3), Donor node, and target IAB node (e.g., IAB node2).

Similar to the embodiments of FIGS. 7, 10 and 11, optional entities of source IAB node and target IAB node and optional steps in the procedure of backhaul link switching shown in FIG. 12 are also marked as dashed.

In Step 0 of FIG. 12, Donor node transmits configuration information to source IAB node (e.g., IAB node3). In Step 1 of FIG. 12, the source IAB node transmits configuration information to IAB node1.

For instance, configuring information transmitted by Donor node includes measurement configuring information for IAB node1. In some examples, the configuring information for IAB node1 is transmitted from Donor node, relayed by source IAB node (i.e., parent IAB node) of IAB node1, and finally reaches IAB node1.

According to some embodiments of the subject application, Donor node or source IAB node will configure a threshold (H1) of backhaul link quality and a threshold (H2) of candidate backhaul link quality.

In some examples, once channel quality of backhaul link between IAB node1 and source IAB node (e.g., IAB node3) is worse than H1 and channel quality of an available candidate backhaul link (e.g., between IAB node1 and IAB node2) is better than H2, trigger condition of a backhaul link switching process is met, and thus the source IAB node (e.g., IAB node3) may transmit backhaul link switching indication to Donor node1.

In Step 2 of FIG. 12, IAB node1 reports the measurement result and other assistant information to the source IAB node. In Step 3 of FIG. 12, the source IAB node transmits a backhaul link switching indication to Donor node once the trigger condition of a backhaul link switching process is met as described in Steps 0 and 1 of FIG. 12. In Step 4 of FIG. 12, Donor node transmits an IAB node accessing indication to a target IAB node to notify that a new IAB node (e.g., IAB node1) will connect to the target IAB node. In Step 5 of FIG. 12, if the target IAB node is available, the target IAB node transmits Acknowledge information to Donor node, to confirm accepting the subsequent backhaul link switching process. In Step 6 of FIG. 12, Donor node transmits a backhaul link switching command to the IAB node1. In Step 7 of FIG. 12, the IAB node1 accesses the target IAB node once receiving the backhaul link switching command. In Step 8 of FIG. 12, the target IAB node transmits an indication of IAB node access completion to Donor node. In Step 9 of FIG. 12, Donor node transmits backhaul link switching completion information to the source IAB node (if any).

All embodiments described in the subject application, for example, all embodiments described for FIGS. 7, 10, and 11, are applicable for the procedure of FIG. 12.

Figure 13:
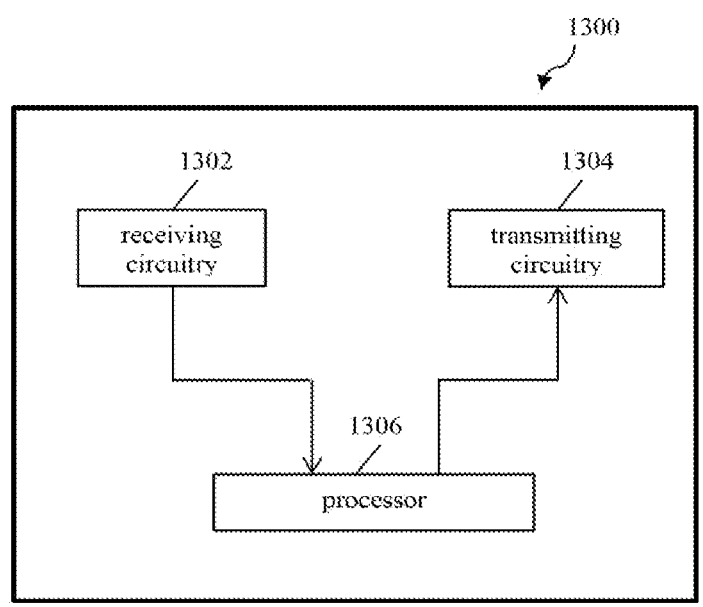
FIG. 13 illustrates an example block diagram of an apparatus according to some embodiments of the subject application.

FIG. 13 illustrates an example block diagram of an apparatus 1300 according to some embodiments of the subject application.

As shown in FIG. 13, the apparatus 1300 may include a non-transitory computer-readable medium (not shown), a receiving circuitry 1302, a transmitting circuitry 1304, and a processor 1306 coupled to the non-transitory computer-readable medium, the receiving circuitry and the transmitting circuitry. The apparatus 1300 may be a base station or a relay. Although in this figure, elements such as processor, transmitting circuitry, and receiving circuitry are described in the singular, the plural is contemplated unless limitation to the singular is explicitly stated. In some embodiments, the receiving circuitry 1302 and the transmitting circuitry 1304 are combined into a single device, such as a transceiver. In certain embodiments, the apparatus 1300 may further include an input device, a memory, and/or other components.

In some embodiments, the non-transitory computer-readable medium may have stored thereon computer-executable instructions to cause a processor to implement the steps with respect to the RN as described above. For example, the computer-executable instructions, when executed, cause the processor 1306 interacting with receiving circuitry 1302 and transmitting circuitry 1304, so as to perform the steps with respect to the RNs depicted in FIGS. 7 and 10-12.

In some embodiments, the non-transitory computer-readable medium may have stored thereon computer-executable instructions to cause a processor to implement the steps with respect to the base station as described above. For example, the computer-executable instructions, when executed, cause the processor 906 interacting with receiving circuitry 1302 and transmitting circuitry 1304, so as to perform the steps with respect to the BS or Donor BS depicted in FIGS. 7 and 10-12.

The method of the subject application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the subject application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The following is what is claimed:

1. A method comprising:
    transmitting an identifier of a first communication device, wherein the identifier comprises an integrated access and backhaul node identifier corresponding to an integrated access and backhaul node; and
    transmitting an identifier of a parent communication device of the first communication device, wherein the first communication device, the parent communication device, and a first base unit constitute a first backhaul link, wherein a backhaul link switching request is transmitted based on a measurement result, and the backhaul link switching request comprises an indication of backhaul link switching and an identifier of a new integrated access and backhaul node to switch to;
    wherein the backhaul link switching request is transmitted in response to channel quality of a link between the first communication device and the parent communication device being lower than a first threshold value and channel quality of a link between the first communication device and a second communication device being higher than a second threshold value.

2. The method of claim 1, wherein the identifier of the first communication device and the identifier of the parent communication device are transmitted in one message, and the message is a radio resource control connection request message.

3. The method of claim 1, further comprising:
    receiving measurement configuring information;
    performing a measurement process according to the measurement configuring information; and
    transmitting the measurement result.

4. The method of claim 3, wherein the measurement result is transmitted to the first base unit.

5. The method of claim 3, wherein the measurement result comprises:
    a measurement result of a link between the parent communication device and the first communication device;
    a measurement result of a link between a second communication device on a second backhaul link and the first communication device; or
    a combination thereof.

6. The method of claim 5, further comprising transmitting the following information:
    an identifier of the second communication device on the second backhaul link;
    an identifier of a second base unit on the second backhaul link;
    number of hops from the second communication device to the second base unit;
    load information of the second communication device; or
    a combination thereof.

7. The method of claim 6, wherein the load information of the second communication device further comprises:
    utilization information of resources allocated to the second communication device;
    number of user equipments served by the second communication device; or
    a combination thereof.

8. The method of claim 1, further comprising:
    receiving a backhaul link switching command from the first base unit; and
    performing a backhaul link switching operation.

9. The method of claim 8, wherein performing the backhaul link switching operation comprises accessing, by the first communication device, a communication device on a backhaul link, wherein the communication device is indicated by the backhaul link switching command.

10. The method of claim 8, wherein the backhaul link switching command comprises an identifier of a communication device on a backhaul link, wherein the first communication device will access the communication device during the backhaul link switching operation.

11. The method of claim 1, wherein information indicating backhaul link switching completion is transmitted from a second base unit to the first base unit.

12. A method comprising:
    receiving an identifier of a first communication device;
    receiving an identifier of a parent communication device of the first communication device from the parent communication device, wherein the first communication device, the parent communication device, and a first base unit constitute a first backhaul link; and
    transmitting a backhaul link switching request based on a measurement result, wherein the backhaul link switching request comprises an indication of backhaul link switching and an identifier of a new integrated access and backhaul node to switch to;
    wherein the backhaul link switching request is transmitted in response to channel quality of a link between the first communication device and the parent communication device being lower than a first threshold value and channel quality of a link between the first communication device and a second communication device being higher than a second threshold value.

13. The method of claim 12, further comprising:
transmitting measurement configuring information; and
receiving the measurement result.

14. The method of claim 13, wherein the backhaul link switching request is sent from a source integrated access and backhaul node to a target integrated access and backhaul node.

15. The method of claim 14, wherein the backhaul link switching request comprises:
the identifier of the first communication device;
an identifier of a user equipment served by the first communication device;
a context of the user equipment;
a measurement result of a link between a second communication device on a second backhaul link and the first communication device;
an identifier of the second communication device on the second backhaul link; or
a combination thereof.

16. The method of claim 13, further comprising receiving an indication of access completion from a communication device on a backhaul link, wherein the first communication device accesses to the communication device during a backhaul link switching operation.

17. The method of claim 13, wherein the measurement result comprises:
a measurement result of a link between the parent communication device and the first communication device;
a measurement result of a link between a second communication device on a second backhaul link and the first communication device; or
a combination thereof.

18. The method of claim 17, further comprising receiving the following information:
an identifier of the second communication device on the second backhaul link;
an identifier of a second base unit on the second backhaul link;
number of hops from the second communication device to the second base unit;
load information of the second communication device; or
a combination thereof.

* * * * *